United States Patent [19]

Cox

[11] 4,270,491

[45] Jun. 2, 1981

[54] ANIMAL LEASH

[76] Inventor: Jack R. Cox, P.O. Box 1104, Myrtle Beach, S.C. 29577

[21] Appl. No.: 85,430

[22] Filed: Oct. 16, 1979

[51] Int. Cl.³ .......................................... A01K 27/00
[52] U.S. Cl. ................................. 119/109; 24/115 G
[58] Field of Search ................ 119/96, 109, 110, 111, 119/126, 153; 54/34; 24/115 R, 115 H, 115 G, 115 K

[56] References Cited

U.S. PATENT DOCUMENTS

| | | | |
|---|---|---|---|
| 504,055 | 8/1893 | Shaw | 119/153 |
| 1,229,855 | 6/1917 | Alexander | 119/115 G |
| 1,879,991 | 9/1932 | Pratt | 119/115 G |
| 3,990,404 | 11/1976 | McNicoll | 119/109 |
| 4,019,463 | 4/1977 | Kitchen | 119/109 |

*Primary Examiner*—Gene Mancene
*Assistant Examiner*—Robert P. Swiatek
*Attorney, Agent, or Firm*—B. P. Fishburne, Jr.

[57] ABSTRACT

A figure-8 choke leash for domestic or veterinary usage employs a free-sliding quick adjusting ring, a cooperating quick release and quick engageable leash mounted adjuster and an adjustable stop button which regulates the ultimate size of the choke or noose portion of the leash. The body of the leash can be constructed from slick plastic rope for ease of operation and low manufacturing cost.

1 Claim, 7 Drawing Figures

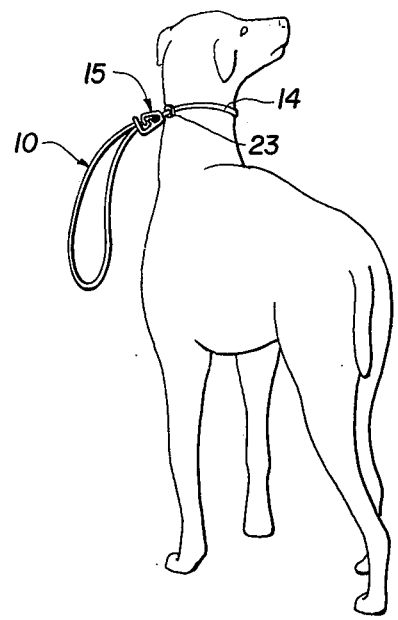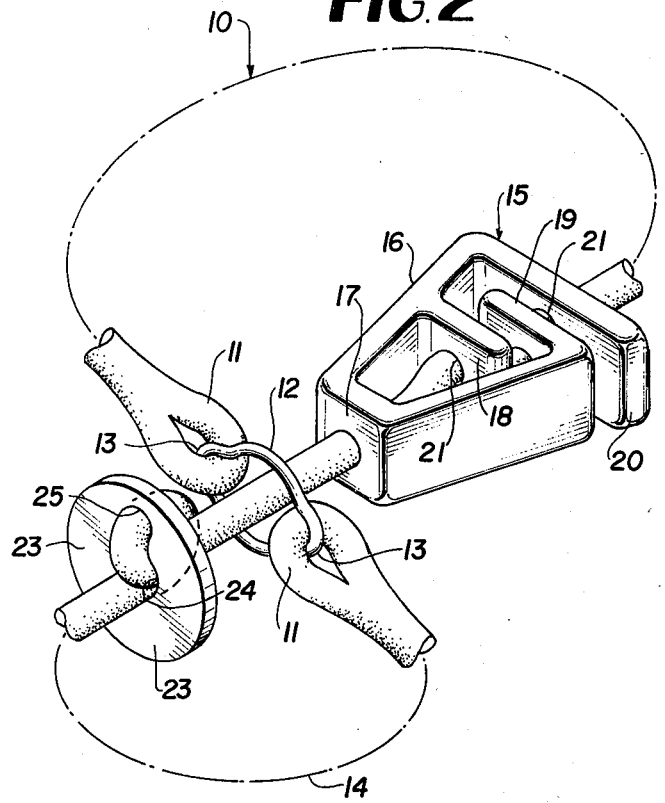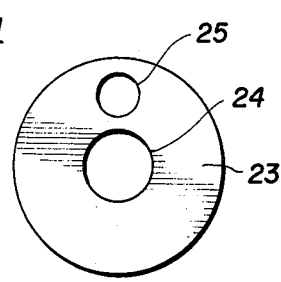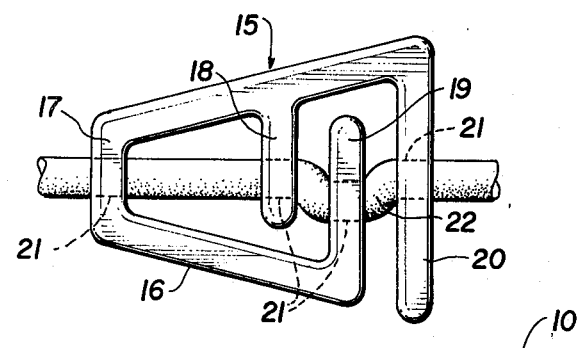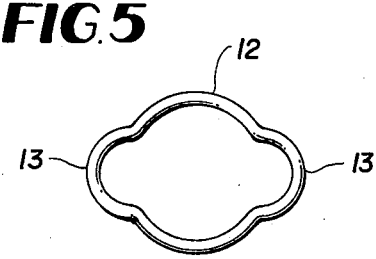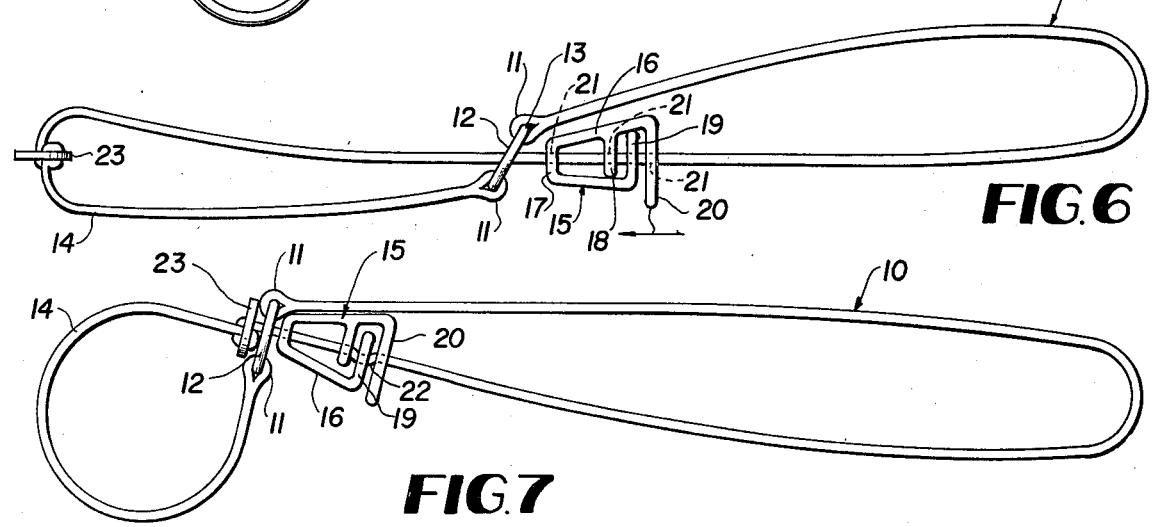

ANIMAL LEASH

BACKGROUND OF THE INVENTION

The present invention is an improvement on that class of animal leash shown in U.S. Pat. No. 3,990,404, issued to A. W. McNicoll on Nov. 9, 1976. Among the objectives of the present invention is to improve on the utility of the prior patented leash, both as a professional leash for doctors of veterinary medicine in restraining dangerous animals and by the owners of household pets. More particularly, the leash in accordance with the invention has improved durability and strength, is more positive in its adjustability and includes quick release means used for adjusting the leash and for securely locking it in any selected adjusted position.

Other features and advantages of the invention will become apparent during the course of the following description.

BRIEF DESCRIPTION OF THE DRAWINGS

FIG. 1 is a perspective view depicting the use of an animal leash according to the invention.

FIG. 2 is an enlarged perspective view of the leash, partly broken away.

FIG. 3 is a fragmentary plan view of a leash adjuster.

FIG. 4 is a plan view of a stop button or disc employed on the leash.

FIG. 5 is a similar view of a free-sliding connector ring.

FIG. 6 is an elevational view of the leash in one position of use.

FIG. 7 is a further elevational view of the leash in a second position of use.

DETAILED DESCRIPTION

Referring to the drawings in detail, an animal leash according to the invention includes a figure-8 body portion 10 ideally formed from a single length of polypropylene rope or equivalent material. Other materials including rope formed of natural fibers or a leather element may be employed in some cases. The leash body portion is formed to provide a pair of opposite end terminal loops or eyes 11 integral therewith joined by a strong free-sliding metal or plastic adjusting ring 12 preferably having opposite side arcuate projections 13 receiving the eyes or terminals 11 and serving to positively locate these eyes and prevent them from moving circumferentially around the body portion of the ring 12. The leash body portion is extended through the adjusting ring 12 and between the attaching eyes 11 for free sliding in the ring 12 when the leash is adjusted in a manner to be described. The arrangement imparts to the leash a figure-8 configuration, as illustrated.

Used in association with the free-sliding ring 12 to quickly and positively adjust the choke or noose portion 14 of the leash is a resilient adjuster 15 preferably also formed of tough plastics material and being unitary in construction. The spring-like adjuster 15 includes an A-frame 16 having a short frontal bar 17, two spaced parallel intermediate bars 18 and 19 which extend in opposite directions inwardly from opposite sides of the A-frame 16, and a rear parallel longer bar 20. The several bars 17, 18, 19 and 20 all possess through openings 21 which are axially aligned, FIG. 6, when manual squeezing pressure is applied by the user to opposite sides of the A-frame 16, the openings 21 being staggered or offset laterally, FIGS. 3 and 7, when the adjuster 15 is in a normal relaxed state.

The through openings 21 slidably receive the rope body portion of the leash and when the adjuster is squeezed to align the openings 21, it can be slid easily along the leash body portion in either direction. When released, the adjuster is inherently biased to the position of FIG. 3 whereby the offset relationship of the openings 21 will produce a lateral loop 22 in the leash body to frictionally resist movement of the adjuster 15 in either direction forwardly or rearwardly with a very secure holding force.

Finally, the leash employs a noose minimum size limiter in the form of a preferably plastic disc 23 having a central aperture 24 and an eccentric smaller aperture 25. The leash body portion is looped twice through the larger center aperture 24 and once through the aperture 25, as shown in FIGS. 2, 6 and 7, to fix the position of the disc 23 on the leash to establish a minimum choke size for the noose 14. The arrangement allows repositioning of the disc 23 on the leash to thereby adjust the ultimate choke size of the noose 14, as required, for the safety of different sizes of animals. Once adjusted or positioned on the leash, the disc 23 will not move even when great pressure is exerted upon it by movement of the adjuster 15 or by tensioning the leash as where the animal is pulling and the owner or veterinarian is holding the leash.

In the use of the leash to restrain an animal, the adjuster 15 can be retracted any necessary distance as in FIG. 6 to greatly enlarge the noose 14 so that the noose can be slipped over the head of the animal with or without its cooperation. With this accomplished, the adjuster 15 is merely squeezed to the release position, FIG. 6, where the openings 21 are aligned and the tips of the bars 18 and 19 are in contact with the opposite sides of the resilient spring-like A-frame 16. At this time, the adjuster 15 can quickly be slid forwardly to engage the ring 12 and slide the latter toward the stop disc 23 any required distance or completely against the disc 23, as shown in FIG. 7, to establish the minimum noose or choke size of the leash. Mere releasing of the adjuster 15 after establishing the desired noose size causes the adjuster to return by spring tension to the locking position shown in FIGS. 3 and 7 whereby the openings 21 are staggered to produce the lateral locking loop 22 in the leash, as described.

By means of the leash, an animal can be quickly leashed and restrained and can equally quickly be released without the necessity for fumbling with buckles and awkward clips. The convenience of the leash for the owners of pets and the safety and convenience for professional users and trainers should be apparent.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An animal leash comprising an adjustable figure-8 body portion including a first loop serving as a noose for the neck of an animal and a second loop serving as a handle, said body portion having two end loop terminals, a free sliding adjusting ring on the body portion and being attached to said end loop terminals, an adjustable stop element on the first loop serving as a noose, and a spring adjuster on the body portion on one side of said adjusting ring and being engageable with the adjusting ring to slide the latter along the body portion when the spring adjuster is in a released state, the spring adjuster being biased into frictional locking engagement with the body portion and being released from said locking engagement by the application of manual pressure to opposite sides of the spring adjuster, the spring adjuster being unitary and having forward and rear bars and at least two intermediate bars in parallel relationship with the forward and rear bars, all of said bars having apertures of sufficient size to receive the body portion slidably therethrough, the spring adjuster further comprising converging side bars both connected with the forward bar of the adjuster and one connected with the rear bar and one of the intermediate bars and the other connected with the other intermediate bar, whereby the application of said manual pressure to opposite sides of said adjuster will move the apertures of the intermediate bars into alignment with the apertures of the forward and rear bars, the spring adjuster when in a relaxed state having the aperture of at least one intermediate bar laterally unaligned with the apertures of the forward and rear bars.

* * * * *